(No Model.)

W. MASON.
DRILL CHUCK.

No. 323,178. Patented July 28, 1885.

Witnesses
J. N. Shumway
Jos. A. Earle

Wm Mason
Inventor.
By Atty
John A. Earle

UNITED STATES PATENT OFFICE.

WILLIAM MASON, OF NEW HAVEN, CONNECTICUT.

DRILL-CHUCK.

SPECIFICATION forming part of Letters Patent No. 323,178, dated July 28, 1885.

Application filed January 12, 1885. (No model.)

*To all whom it may concern:*

Be it known that I, WILLIAM MASON, of New Haven, in the county of New Haven and State of Connecticut, have invented new Improvements in Drill-Chucks; and I do hereby declare the following, when taken in connection with the accompanying drawings, and the letters of reference marked thereon, to be a full, clear, and exact description of the same, and which said drawings constitute part of this specification, and represent, in—

Figure 1:
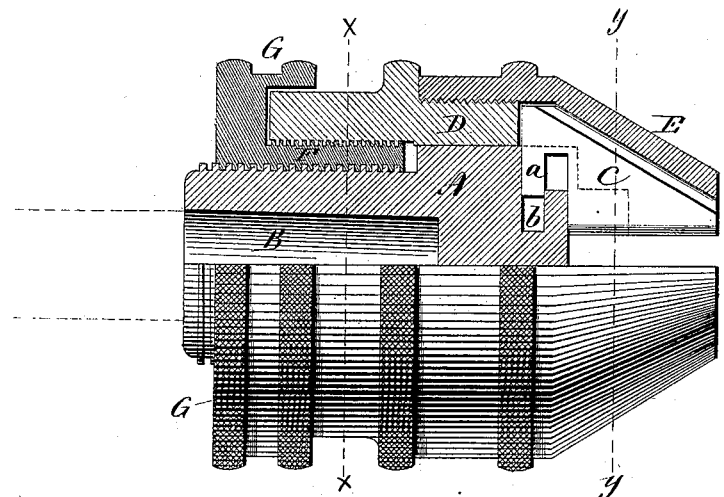
Figure 3:
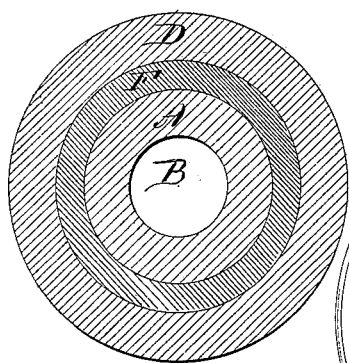
Figure 2:
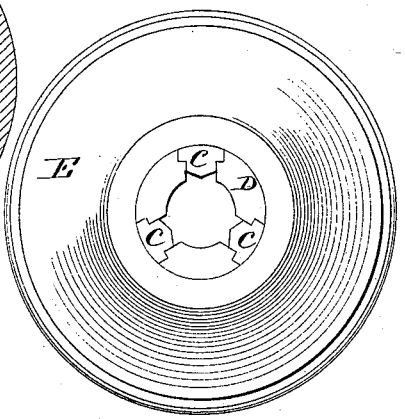
Figure 4:
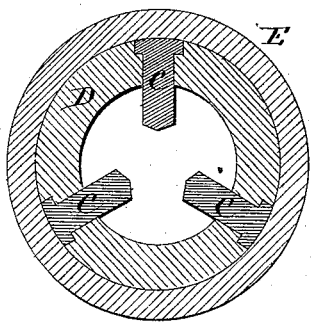

Figure 1, a side elevation, a portion cut away, showing a longitudinal central section; Fig. 2, a front end view; Fig. 3, a transverse section on line $x$ $x$ of Fig. 1; Fig. 4, a transverse section on line $y$ $y$.

This invention relates to an improvement in that class of chucks which are adapted to be attached to the mandrel of a lathe or similar machine, and provided with jaws arranged to grasp the shank of a drill or other article and hold it in a concentric position, commonly called "drill-chucks." In the usual construction of this class of chucks three jaws are arranged around the center in connection with the body of the chuck, to prevent longitudinal movement and be free for radial movement. They are supported in the head of the chuck, the head arranged to move longitudinally on the body of the chuck. The back of the jaws are inclined inward and forward, and the head of the chuck correspondingly contracted, and so that as the head is moved longitudinally on the body the jaws will be moved radially from each other or radially toward each other, according to the direction in which the head is turned, a common and well-known construction. In the usual construction the head is internally screw-threaded, and the body of the chuck correspondingly screw-threaded upon its circumference, and so that the head is moved longitudinally on the body by rotating the one and holding the other. In practical use the adjustment is made in the lathe, the body revolving with the mandrel of the lathe. The head is held by the hand of the operator, and so that the workman turns the mandrel accordingly as he desires to move the jaws out or in. The grasping force of the jaws upon the shank of the drill, or whatever it may be the chuck is to hold, is therefore only such as can be produced by hand. If the screw be very fine, so as to increase this power, then the movement will be so slow as to be objectionable. It is desirable to make the movement whereby the grasping or releasing of the jaws is produced as quickly as possible, yet that it shall be very strong.

The object of my invention is to accomplish these two desirable objects; and it consists in combining with the head and body a sleeve in screw-threaded connection with the body, and also in screw-threaded connection with the head, but the two threads differential, one quick and the other slow—that is, one coarse and the other fine thread—and whereby the head and sleeve may move together under a quick movement for the general adjustment of the jaws, and then the sleeve be turned independent of the head and body, whereby the force of the differential threads will be brought to bear upon the jaws and greatly increase the grasping force, and as more fully hereinafter described.

A represents the body of the chuck, adapted to receive a shank in a cavity, B, in its rear end, or it may be provided with a shank, as indicated in broken lines, for attachment to the lathe-mandrel; C C C, the three jaws, which are arranged in the head D in the usual manner. The forward end of the head is of usual conical shape, and the jaws are arranged to move longitudinally therein or the head to move longitudinally on the jaws. The inner end of the jaws are interlocked with the body by a tongue, $a$, on their inner end, extending into an annular groove, $b$, on the forward end of the body. The back of the jaws are inclined, corresponding to the conical shape of the head, and over the jaws and conical part of the head the corresponding conical-shaped cap E is applied, and secured to the body by a screw-thread, as shown, also of usual construction, and so that as the head with the cap is moved longitudinally on the body the jaws will be moved radially out or in, according to the direction of movement of the head, a construction common and well known.

Instead of making the screw-threaded connection directly between the head and body, as in the usual construction, I introduce a sleeve, F, between the two. This sleeve is screw-threaded, corresponding to a screw-thread on the body, and this may be a thread considerably coarser or quicker than that usually employed. The outer surface of the sleeve is also screw-threaded, but considerably finer or slower than the thread between the sleeve and body. The interior of the body is screw-threaded, corresponding to the screw-thread on the outer surface of the sleeve. At the rear end the sleeve has an annular projection, G, to serve as a convenient means for turning the sleeve, and this projection corresponds substantially to the surface of the head, and so that the workman may readily grasp the two. Between the head and the sleeve there is a limited amount of longitudinal play, so that either may move longitudinally, to some extent independent of the other.

In the general adjustment of the chuck the operator grasps the sleeve and head as if they were one piece and like the common chuck-head. Then rotating the head or body, as the case may be, longitudinal movement is imparted corresponding to the screw-thread between the sleeve and the body. Thus held, the operation upon the jaws is substantially the same as in the usual construction of chucks, and continues until the jaws have reached a bearing upon the thing to be grasped. When this point is reached, the operator releases his grasp upon the head and holds the sleeve only. Continuing its rotation, it moves on the body according to the screw-thread between the sleeve and body, and also moves the head according to the screw-thread between the sleeve and head, it being understood that both screws are in the same direction—that is, both are right-hand or both left-hand. The result of this differential screw is that in this independent movement of the sleeve the head is moved only to the extent of the difference between the two threads. These differential threads thus working give to the head a very slow movement compared to that of the sleeve, and correspondingly increases the power of the head upon the jaws, and so that by the employment of the independent sleeve the grasp of the jaws upon the article between them is made of the strongest possible character. At the same time, in the general adjustment of the jaws, that movement may be very quick—considerably quicker than would be practical in a chuck where the movement of the jaws is dependent upon the single screw-thread between the head and body. In relieving the grasp of the jaws the same increase of power is produced by first turning the sleeve independent of the head and body, so as to start the jaws, then grasping the head and sleeve together, the opening movement of the jaws will be very rapid.

I claim—

1. In a drill-chuck, the combination of the body, a head longitudinally movable thereon, several jaws arranged in said head free for radial movement independent of the body, but in connection with the body, whereby longitudinal movement with the head is prevented, a sleeve between the body and head, the adjacent surfaces of the body and sleeve and sleeve and head both screw-threaded in the same direction, but with differential threads, substantially as described.

2. The combination of the body A, the head D, arranged on the body and so as to move longitudinally thereon, jaws C, arranged radially in said head free for radial movement, but in connection with the body, and thereby held to prevent longitudinal movement of the jaws with the body, the head and backs of the jaws of conical shape, the correspondingly conical-shaped cap E, secured to the head over the jaws, the sleeve F, arranged between the body A and the head D, the outer surface of the body and the inner surface of the sleeve correspondingly screw-threaded, and the outer surface of the sleeve and the inner surface of the head correspondingly screw-threaded, the two threads in the same direction, but of differential pitch, the sleeve constructed with an annular projection corresponding substantially to the exterior of the head, substantially as described.

WM. MASON.

Witnesses:
JOHN E. EARLE,
JOS. C. EARLE.